T. ARGALL.
REDUCTION GEARING.
APPLICATION FILED AUG. 11, 1917.

1,363,077.

Patented Dec. 21, 1920.

INVENTOR.
Thomas Argall
BY
ATTORNEYS.

UNITED STATES PATENT OFFICE.

THOMAS ARGALL, OF RANKIN, PENNSYLVANIA, ASSIGNOR TO PITTSBURGH METER COMPANY, A CORPORATION OF PENNSYLVANIA.

REDUCTION-GEARING.

1,363,077.      Specification of Letters Patent.      Patented Dec. 21, 1920.

Application filed August 11, 1917. Serial No. 185,781.

*To all whom it may concern:*

Be it known that I, THOMAS ARGALL, a citizen of the United States, and a resident of Rankin, in the county of Allegheny and State of Pennsylvania, have made a new and useful Invention in Reduction-Gearing, of which the following is a specification.

This invention relates to reduction gearing on meters and has for an object to produce a reduction gearing of simple construction and which is simple to manufacture.

A further object is to produce an improved reduction gearing which includes fewer number of parts than the gearings now in use and which also includes means for obtaining perfect alinement in spindle bearings and accurate centering of spindles.

A further object is to produce a reduction gearing which is cheaper to manufacture than similar gearings now on the market and in which means are employed for preventing the bearings from moving out of alinement and thereby causing the spindle to bind while the gearing is in use.

These and other objects which will be made apparent throughout the further description of the invention are obtained by means of the reduction gearing embodying the features herein described and illustrated in the drawing forming a part hereof.

In the drawings: Figure 1 is a fragmental and vertical sectional view of a meter equipped with a reduction gearing embodying my invention.

Figure 1:
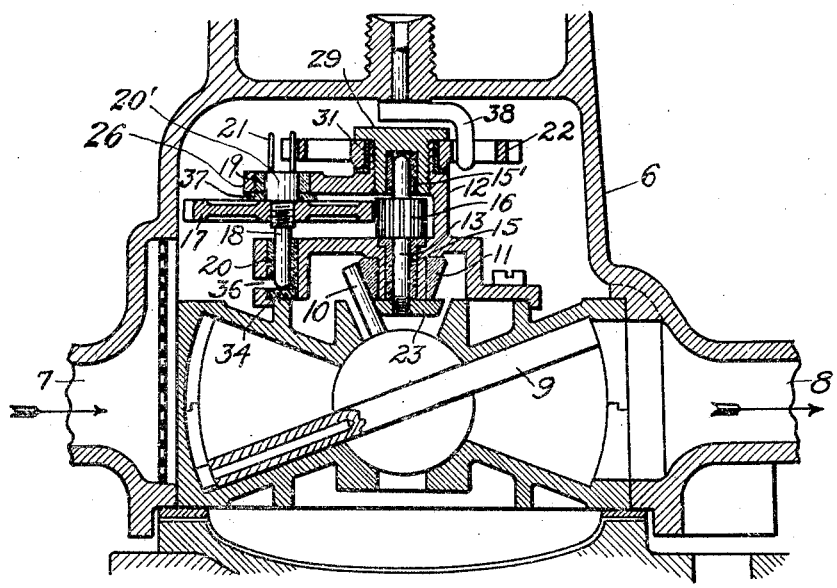
Figure 2:
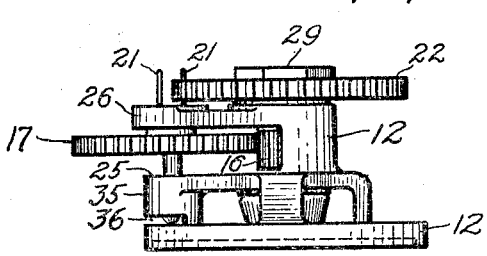
Fig. 2 is a side elevation of the reduction gearing illustrated in section in Fig. 1.

For the purpose of fully disclosing my invention I will first describe the meter illustrated in Fig. 1 which is an exemplification of one type of meter equipped with a gearing embodying my invention. The meter includes a casing 6 provided with an inlet port 7 and a delivery port 8. The port 7 delivers fluid to the measuring chamber of the meter from which the fluid is delivered through the port 8 in the usual manner. The measuring chamber of the meter is equipped with a wabble disk 9 which operates in the usual manner in response to the flow of fluid through the meter and which imparts motion to the reduction gearing by means of a pin 10.

The pin 10 is caused to move in a circular path in response to the operation of the disk 9 by reason of the fact that the gearing is provided with a controlling roller 11 which is of the usual construction.

The gear illustrated as an embodiment of my invention includes a one piece frame 12 which may be formed in any suitable manner as, for example, by being cast. The driving spindle 13 of the gearing is journaled in bearings 15 and 15′ mounted on the frame and the driving pinion 16 is mounted on the spindle between the bearings. A gear 17 meshes with the pinion 16 and is mounted on a spindle 18, which may be termed a second spindle, and which is journaled in bearings 19 and 20 mounted on the frame above and below gear 17. The spindle 18 is provided with an enlarged collar 20′, which is so formed on the spindle that it forms the bearing engaging portion of the spindle and also carries pins 21.

The pins 21 are adapted to mesh with and drive the register actuating gear 22 of the gearing which in the present embodiment of the invention is journaled on the frame and is located concentrically with the spindle 13. Motion is imparted to the gearing by means of a crank 23, which is mounted on the spindle 13 and which is engaged by the pin 10 of the wabble disk 9.

Figure 5:
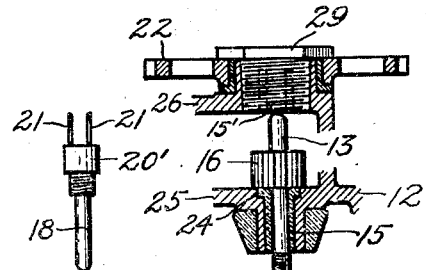
Fig. 5 is a disassembled view including fragmental sectional views showing the arrangement of the bearings, the driving spindle and means employed for mounting the register actuating gear on the gearing frame.
Figure 4:
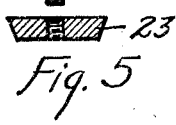
Fig. 4 is a disassembled view of a gear and spindle forming a detail of the gearing.
Figure 3:
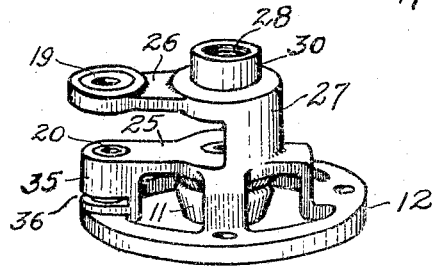
Fig. 3 is a perspective view of a reduction gearing frame which is illustrated in both Figs. 1 and 2.

Inasmuch as the frame 12 is formed in one piece, new and improved means are employed for so mounting the different parts of the gearing on the frame that they may be readily assembled and disassembled. In Fig. 5, I have illustrated the means employed for mounting the spindle 13 and consequently the pinion 16 and the crank 23. The bearing 15 may be of the usual form except that the hard rubber bushing is provided at its upper end with a collar 24 countersunk into the lower table 25 of the frame so that the end of the bushing is flush with the upper and flat surface of the table. The bearing table 26 of the frame is supported on the lower table by means of a pedestal 27, which is integrally formed with both the tables 25 and 26 and which forms a partial housing for the pinion 16. In order that the spindle 13 and the parts mounted on it may be assembled with the frame, the upper table 26 is provided with an aperture 28, which is located concentrically with the bearing 15 and is of sufficient size to permit the spindle 13 and the pinion 16 to be inserted through it in the operation of inserting the lower end of the spindle through the bushing which forms the bearing 15. In order that this may be accomplished, the crank 23 is removably secured to the spindle.

In the drawings the crank as shown is tapped and is adapted to be screwed on to screw threads formed on the lower end of the spindle. These threads are so formed that the motion imparted to the crank by the driving pin 10 will tend to screw the crank onto the spindle. This will prevent the crank from loosening during the operation of the meter. The upper bearing 15' of the spindle 13 is formed in a removable cap 29, which is adapted to be screwed into the aperture 28. This cap also operates to retain the gear 22 in place on the frame.

As shown, the gear 22 is journaled on an upwardly extending annular flange 30 which surrounds the aperture 28 and into which the cap 29 is screwed. In the drawings I have shown a hard rubber bushing 31 surrounding the flange 30 and forming the bearing for the gear 22. This bushing is provided at its lower end with an outwardly projecting annular flange which forms an end bearing for the gear 22. The cap 29 overhangs the aperture 28 and thereby prevents lateral motion of the gear 22.

The bearings 19 and 20 of the spindle 18 are mounted on the tables 26 and 25 respectively. The lower end of the spindle is of a less diameter than the collar 20 which is normally located within the bearing 19 and consequently the spindle 18 may be inserted downwardly through the bearing 19 and into the bushing which forms the bearing 20. The lower end of the spindle 18 is mounted on an end bearing 34, which forms a part of the bushing 20. As illustrated the supporting pedestal 35 of the table 25 in which the bearing 20 is mounted, is provided with notch 36, which permits a circulation of lubricating water around the end of the spindle 18. The gear 17 is screwed onto the spindle 18 and is so located on the spindle that it engages a washer 37 when in place on the spindle and thereby holds the spindle against excessive lateral motion. The washer 37 also operates as a spacer between gear 17 and the lower face of the table 26. The screw threads are so formed on the spindle that the motion imparted to the gear 17 by pinion 16 tends to force the gear against the spacing washer 37 and therefore prevents the gear from loosening during the operation of the meter. The motion imparted to the gear is transmitted to the register mechanism of the meter by the gear 22 through the agency of a crank arm 38, which projects downwardly between the spokes of the gear 22 or into an aperture formed in the web of the gear.

The operation of assembling the reduction gearing is as follows: The various bearing bushings are mounted in place on the frame. The spindle 13 is then dropped to place through the aperture 28. The gear 17 is then located between the tables 25 and 26 so that its teeth engage the pinion 16 and so that its tapped spindle engaging opening is in substantial alinement with the bearings of the spindle 18. The spindle 18 is then inserted through the bearing 19 and into the bearing 20 against the end bearing 34. The gear 22 may then be mounted on its bearing which surrounds the flange 30. The cap 29 may then be screwed into the aperature 28 for the purpose of securing the gear 22 in place and also for securing the spindle 13 in place. The gear 22 may then be employed for holding the spindle 18 against rotation and the gear 17 may then be turned for the purpose of screwing it onto spindle and rigidly mounting it on the spindle. The crank 23 is then screwed onto the lower adjacent projecting end of the spindle 13 and the gearing is assembled.

The operation of dismantling the gearing is practically the reverse of the operation just described.

While I have described and illustrated but one embodiment of my invention, it will be apparent to those skilled in the art that various changes, modifications, substitutions, omissions and additions may be made in the apparatus illustrated without departing from the spirit and scope of the invention, as set forth in the appended claims.

I claim—

1. In combination in a reduction gearing for meters, a one piece frame comprising two bearing supporting tables spaced apart and located in substantial parallelism, a spindle, a pinion rigidly mounted thereon and movable through an aperture formed in one table into engagement with a bearing formed on the other table, an integral annular flange formed on one table and surrounding said aperture, a gear journaled on said flange, and a cap fitted into said flange, forming a bearing for said spindle, and holding said gear in place on said flange.

2. In combination in a reduction gearing, a single piece frame having two tables spaced apart, a spindle having a gear mounted thereon movable through an aperture formed in one table to a position such that one end of the spindle engages a bearing mounted in the other table, and the gear is located between the tables, a second gear meshing with the first gear, a third gear axially alined with the first gear and mounted on a flange surrounding the aperture through which said spindle is movable, and a cap for said flange forming a bearing for said spindle and holding said third gear in place.

3. In combination in a reduction gearing, a single piece frame having two bearing supporting tables spaced apart and forming an integral part of the frame, a pair of gears located between said tables, and journaled on bearings mounted on said tables, a cap forming one of said bearings projecting through an aperture formed in one of the tables, and a gear journaled on the frame on the outside of one of the tables and held in place by said cap.

4. In combination in a reduction gearing, a single piece frame having two bearing supporting tables spaced apart, located in substantial parallelism, and forming an integral part of said frame, a pair of intermeshing gears located between said tables and having their spindles journaled in bearings mounted on the tables, a gear journaled on one of said tables independently of the spindles and operatively connected to the first mentioned gears, and a cap extending through an aperture formed in said table for holding said last mentioned gear in place and forming a bearing for the spindle of one of the first mentioned gears.

5. In combination in a reduction gearing for meters, a frame having two bearing supporting tables spaced apart and forming an integral part of said frame, a pinion located between said tables, a shaft on which said pinion is mounted, a bearing for one end of said shaft mounted on one of said tables, means mounted on the other table and forming a second bearing for said spindle, and a gear journaled on said last mentioned table and held in place by said means.

6. In combination in a reduction gearing for meters, a frame comprising two bearing-supporting tables spaced apart and forming an integral part of said frame, a pinion, a spindle on which said pinion is mounted, both being movable through an aperture formed in one of said tables to a position such that the pinion is located between said tables, a bearing for one end of said spindle mounted on one of said tables, a bearing for the other end of said spindle mounted on a member secured to the other table and closing the aperture formed therein, a gear located between said tables and meshing with said pinion, second bearings in the said tables and a second spindle on which said gear is mounted after the spindle is inserted in said second bearings.

7. In combination in a reduction gearing for meters, a one piece frame having two bearing-supporting tables integrally formed therewith, a spindle journaled in bearings mounted on both tables and projecting through one table, a control roller mounted on one table and surrounding the projecting end of said spindle, a gear mounted on the spindle and located between the tables, a second gear located between the tables and meshing with the first, a second spindle on which said second gear is mounted, bearings for said second spindle located on opposite sides of the gear and mounted on the tables, a third gear driven by said intermeshing gears and journaled on one of said tables, and means removably secured to said table, providing a bearing for the first spindle and holding said last mentioned gear against lateral displacement.

8. In a reduction gearing for meters, a spindle, a pinion rigidly mounted thereon, a one piece frame having spaced table members between which said pinion is adapted to be located, one of said members being provided with a journal in which the spindle is inserted longitudinally through an aperture formed in the other table, a gear mounted on an outwardly extending annular flange surrounding said aperture, and means mounted on the frame and forming a second journal for the spindle and holding said gear in place on said frame.

In testimony whereof I have hereunto subscribed my name this 10th day of August, 1917.

THOMAS ARGALL.